US008583287B2

(12) United States Patent
Kase et al.

(10) Patent No.: US 8,583,287 B2
(45) Date of Patent: Nov. 12, 2013

(54) ROBOTIC SYSTEM, ROBOT CONTROL METHOD AND ROBOT CONTROL PROGRAM

(71) Applicant: Panasonic Corporation, Kadoma (JP)

(72) Inventors: Hiroshi Kase, Osaka (JP); Takashi Horinouchi, Osaka (JP); Michihiko Otsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/736,520

(22) Filed: Jan. 8, 2013

(65) Prior Publication Data

US 2013/0123987 A1 May 16, 2013

Related U.S. Application Data

(63) Continuation of application No. PCT/JP2012/002704, filed on Apr. 19, 2012.

(30) Foreign Application Priority Data

Jun. 14, 2011 (JP) ................................. 2011-132602

(51) Int. Cl.
*G05B 15/00* (2006.01)
*G05B 19/00* (2006.01)

(52) U.S. Cl.
USPC ................................. 700/259; 901/1; 901/46

(58) Field of Classification Search
USPC ................. 446/175; 463/1, 29; 700/245–264; 382/153; 901/1, 46–47, 50; 706/45–61
See application file for complete search history.

(56) References Cited

U.S. PATENT DOCUMENTS

| 4,815,733 | A  | * | 3/1989 | Yokoi .............................. 463/31 |
| 6,560,511 | B1 | * | 5/2003 | Yokoo et al. ................... 700/245 |
| 6,684,127 | B2 |   | 1/2004 | Fujita et al. |
| 2002/0049515 | A1 |   | 4/2002 | Osawa |
| 2002/0138175 | A1 |   | 9/2002 | Fujita et al. |
| 2003/0191560 | A1 | * | 10/2003 | Yokoo et al. ................... 700/245 |
| 2006/0098877 | A1 | * | 5/2006 | Barnes et al. ................. 382/203 |
| 2007/0192910 | A1 |   | 8/2007 | Vu et al. |
| 2007/0213872 | A1 | * | 9/2007 | Matsuzaki et al. ............ 700/245 |
| 2010/0268359 | A1 | * | 10/2010 | Prestenback et al. ........... 700/94 |
| 2012/0185090 | A1 | * | 7/2012 | Sanchez et al. ............... 700/253 |

FOREIGN PATENT DOCUMENTS

| JP | 2002-160184 | 6/2002 |
| JP | 2003-071761 | 3/2003 |
| JP | 2003-202892 | 7/2003 |

(Continued)

OTHER PUBLICATIONS

Daily Mail Reporter, "Pictured: The robot that can pull faces just like a human being", Mail Online, Nov. 12, 2008.*

*Primary Examiner* — Khoi Tran
*Assistant Examiner* — Abby Lin
(74) *Attorney, Agent, or Firm* — Hamre, Schumann, Mueller & Larson, P.C.

(57) ABSTRACT

A robotic system includes: a detection unit that detects at least one of a voice, light and an image of a content outputted by a content output device; a decision unit that assesses information detected by the detection unit on the basis of reference data so as to assess the content outputted by the content output device; and a control unit that controls a behavior or a state of the robotic system on the basis of the assessment made by the decision unit.

16 Claims, 14 Drawing Sheets

(56) References Cited

FOREIGN PATENT DOCUMENTS

| JP | 2004-249447 | 9/2004 |
|----|-------------|--------|
| JP | 2005-074562 | 3/2005 |
| JP | 2005-169567 | 6/2005 |
| JP | 2006-245941 | 9/2006 |
| JP | 2008-307662 | 12/2008 |
| JP | 2001-310283 | 11/2011 |
| WO | 00/67959 | 11/2000 |

* cited by examiner

| Content ID | File name | Date and time | Unviewed flag |
|---|---|---|---|
| 0001 | /contents/video/file1.mpg | 2011/01/01-11:01:25 | 0 |
| ⋮ | | | |
| 0120 | /contents/video/file051.mpg | 2011/05/05-15:51:53 | 1 |

FIG. 7

Example of pairing image

| Content ID | Number of reproductions | Date and time of last reproduction |
|---|---|---|
| 0094 | 5 | 2011/02/15-13:01:00 |
| ⋮ | ⋮ | ⋮ |
| 0114 | 1 | 2011/05/05-18:11:50 |

FIG. 12

ROBOTIC SYSTEM, ROBOT CONTROL METHOD AND ROBOT CONTROL PROGRAM

CROSS REFERENCE TO RELATED APPLICATIONS

The present application is based upon and claims the benefit of priority of the prior Japanese Patent Application No. 2011-132602 filed on Jun. 14, 2011, and is a continuation of the International application No. PCT/JP2012/002704 filed on Apr. 19, 2012, the entire contents of which are incorporated herein by reference.

TECHNICAL FIELD

The disclosure of the present application relates to a robotic system that makes an assessment with respect to a reproduced content, a robot control method and a robot control program.

BACKGROUND ART

Recently, pet robots sold by various manufactures are observed more often in ordinary households. Some robots even react to calling by human beings, thereby dispensing information on contents or the like while communicating with human beings.

For an example of robots that dispense contents while communicating with human beings, a robot that selects and reproduces a content that accommodates the robot's emotion has been proposed (see Patent document 1 for example). In the content reproducing system as described in Patent document 1, a robotic system, which changes its emotion in accordance with a stimulus from the outside and acts autonomously, and sends emotion information to a content reproducer. The content reproducer compares meta-data on which information about contents have been written and the emotion information of the robotic system, and selects and reproduces the content accommodating to the emotion of the robotic system so as to express the emotion of the robotic system.

In another example of proposed robotic systems, a robot recognizes special codes such as a specific scale command or a two-dimensional barcode included in television broadcasting and thus the robot is allowed to act in accordance with the special codes (see Patent document 2 for example).

PRIOR ART DOCUMENTS

Patent documents

Patent document 1; JP 2005-169567
Patent document 2; JP 2001-310283

However, the constitution disclosed by Patent document 1 displays only contents following the emotion of the robotic system, but there is no mechanism for the robot to assess the contents independently. In the constitution disclosed by Patent document 2, the manifested behavior of the robot is controlled in accordance with the special codes superimposed on broadcasted video data, but there is no mechanism for the robot to assess the broadcast program or the like independently.

SUMMARY

A robotic system according to an embodiment disclosed in the present application includes; a detection unit that detects at least one of an audio and an image of a content outputted by a content output device; a decision unit that assesses information detected at the detection unit on the basis of reference data so as to assess the content outputted by the content output device; and a control unit that controls a behavior or a state of the robotic system on the basis of the assessment made by the decision unit.

The present invention includes also a program for allowing a computer to function as the robotic system, a non-transitory recording medium on which the program has been recorded, and a method for the computer to execute the functions.

BRIEF DESCRIPTION OF DRAWINGS

FIG. 7 is a diagram showing an example of a content list.
FIG. 12 is a diagram showing an example of a favorite list in Embodiment 5.

DETAILED DESCRIPTION OF THE EMBODIMENT

In a robotic system according to any of the embodiments of the present invention, a decision unit assesses contents on the basis of reference data, and the behavior and/or the state of the robotic system is controlled on the basis of the result. Therefore, the robotic system is capable of making an assessment unique to the robot with respect to the content and express a reaction unique to the robotic system with respect to the content.

According to the embodiments of the present invention, it is possible to provide a robotic system that enables making an assessment unique to a robot with respect to a content, a method thereof and a program therefor.

Embodiment 1

Example of Robot and Display Device

Figure 1:
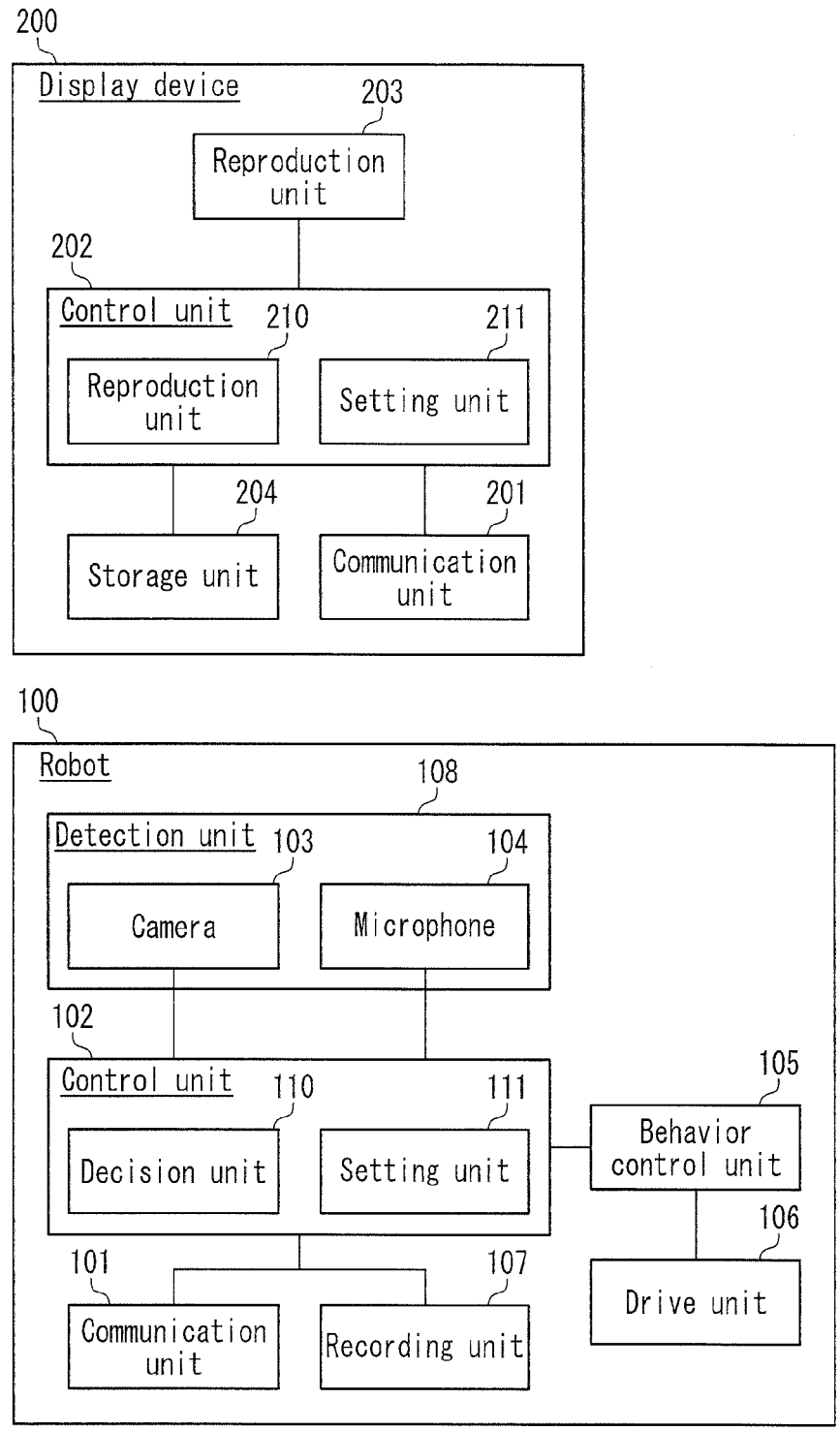
FIG. 1 is a functional block diagram showing an example of a system including a robot in Embodiment 1.

FIG. 1 is a functional block diagram showing an example of a system including a robot according to Embodiment 1.

The system shown in FIG. 1 includes a display device 200 and a robot 100. The display device 200 is an example of content output devices, and the robot 100 is an example of robotic systems.

The display device 200 can be constituted with for example a television apparatus, a tablet, PC, PDA, a video game machine, a mobile telephone or the like, and it has a function of outputting an image and an audio of the content. Specifically, the display device 200 includes a reproducing unit 203, a control unit 202, a storage unit 204, and a communication unit 201. The reproducing unit 203 reproduces a content such as video data and audio data as a video and an audio. The control unit 202 includes a reproduction unit 210 and setting unit 211. The reproduction unit 210 controls the reproducing unit 203 so as to control reproduction, halt, pause, reproduction position and the like of the content recorded in the storage unit 204, on the basis of an external instruction, for example. The setting unit 211 can set the action condition of the display device 200 by recording in the storage unit 204 information regarding an external device that instructs actions to the display device 200, information indicating a reproduction condition or the like, information regarding a content reproducible at the display device 200 and the like, for example. The communication unit 201 functions as an interface that communicates with external equipment of the display device 200 (for example, a server for supplying contents, the robot 100 for sending action instructions to the display device 200, and the like).

The robot 100 includes a communication unit 101, a control unit 102, a detection unit 108 that includes a camera 103 and a microphone 104, a behavior control unit 105 and a drive unit 106. The communication unit 101 mainly communicates with external equipment such as the display device 200. It is possible to connect the communication unit 201 of the display device 200 and the communication unit 101 of the robot 100 through a wire or radio network (including a public line), thereby enabling transmission and reception of data or signals. For communications by the communication units 201 and 101, techniques such as Wifi (trademark), Bluetooth (trademark), Zigbee (trademark) or the like can be used. The types of communications of the communication units 201, 101 are not limited in particular.

The detection unit 108 detects at least one of the audio and the image of the content reproduced by the display device 200. Therefor, the detection unit 108 is provided with for example a camera 103 as an example of photographing unit for detecting images and a microphone 104 as an example of a sound-collecting unit for detecting voices. The constitution of the detection unit 108 is not limited to the above-mentioned example but it can include any other sensors for monitoring the external or internal state of the robot 100. Specifically, it is possible to include in the detection unit 108 a touch-sensor or a pressure sensor that detects a contact or pressure from the outside to the robot 100, an external sensor such as a heat sensor, an internal sensor that monitors the battery (not shown) of the robot 100 and the like. Alternatively, the detection unit 108 may be equipped with either the camera 103 or the microphone 104.

The control unit 102 has a decision unit 110 that assesses the external or internal condition and/or the reproduced content by use of information detected by the detection unit 108, and a setting unit 111 that sets information indicating actions of the robot 100 and information for communications. The decision unit 110 can have a function of assessing the content outputted by the display device 200 by assessing the information detected by the detection unit 108 on the basis of the reference data. The reference data denote data to be referred to in an assessment of the content. The decision unit 110 can perform a process of viewing the content reproduced by the display device 200, by use of a viewing application for allowing the robot 100 to execute the process. Specifically, the decision unit 110 analyzes the image of the content included in the images photographed with the camera 103 on the basis of the reference data recorded in the recording unit 107, thereby allowing an assessment of the content. Similarly, it is possible to assess the content by analyzing the voice of the content collected by the microphone 104 on the basis of the reference data. In this case, the assessment process by the decision unit 110 will include a process of extracting an image or a voice of the content included in the detected image or audio and also a process of matching the image or voice of the extracted content with the reference data.

The reference data can be prepared as a template (reference pattern) that matches the image or the voice of the content detected by the detection unit 108 for example. For example, in a case of an image, data that indicate a feature vector listing feature values of respective pixels can be applied as a pattern. In a case of a voice, data indicating a set of feature values of respective frames can be applied as a pattern. Furthermore, in a case where a moving image is detected, motions of a person in the moving image can be applied as a pattern of data expressing motions (changes) of the skeletal frame (limbs). The reference data may be registered in advance by a user, or the data may be stored automatically based on information obtained by the robot 100 through the detection unit 108.

Furthermore, the robot 100 may acquire, as its reference data, data recorded in the display device 200 or data recorded on a location indicated by information recorded in the display device 200. Thereby, it is possible for the robot 100 to collect information relating to the display device 200 in order to use the information as a reference for content assessment by the robot 100. As a result, the assessment criteria of the robot 100 (for example, preference) can be affected by the display device 200.

Further, the robot 100 can update the reference data on the basis of the content assessment made by the decision unit 110. Thereby, the robot 100 can transit its own assessment criteria (for example, preference) spontaneously.

In this manner, the robot 100 has a function of acquiring, storing or updating automatically information serving as criteria for content assessment without external instructions such as user's input, and thus unique content assessment of the robot 100 can be realized.

The content assessment made by the decision unit 110 may be a process of calculating a value (score) indicating the level of favorability, aversion, boredom and the like with respect to the content. Or it may be a process of judging whether the content includes predetermined information or not. For example, the decision unit 110 can calculate the score or execute the above-mentioned judgment on the basis of the matching level between the pattern of the reference data and the content pattern. It should be noted that the substances of the reference data and the process at the decision unit 110 are not limited to the above-mentioned example.

The control unit 102 controls the behavior or the state of the robot 100 on the basis of the assessment made by the decision unit 110. For example, the control unit 102 controls the actions of the drive unit 106 through the behavior control unit 105, and thus it can control the action of the robot 100.

The drive unit 106 can be, for example, an actuator (motor) or the like that moves the movable part of the robot 100. For the actuator of the drive unit 106, artificial muscles also can be used. Further, the robot 100 may include a light-emitting unit and/or a phonation unit in place of or in addition to the movable part.

The behavior control unit 105 can record information indicating the manifestation condition, manifestation percentage, and manifestation availability of the robot 100 as parameters so as to output a control signal to the drive unit 106 in accordance with the parameters. In this case, the control unit 102 can control the action of the robot 100 by updating the parameters in accordance with the assessment made by the decision unit 110.

The setting unit 111 acquires setting information for communicating with the display device 200 and records the information on the recording unit 107. For example, the setting unit 111 can acquire setting information for communicating with the display device 200 by analyzing at least one of the audio, the light and the image outputted by the display device 200 and record the information in the recording unit 107. For example, the camera 103 of the robot 100 photographs the screen of the display device 200 on which a two-dimensional code including the address information of the display device 200 as the setting information is displayed and the setting unit 111 analyzes the screen, so that the address information of the display device 200 can be acquired. The setting unit 111 transmits an access permission request (e.g., a pairing request) using the address information to the display device 200 and obtains permission from the display device 200, and thus communications therebetween become available.

The setting information expressed with the two-dimensional code may include not only the access information to the display device 200 but also certified information for obtaining the access permission. The certified information may include for example random values (numerical values or character strings). In this case, the robot 100 transmits the pairing request and also the random values that have been read out from the setting information to the display device 200. In a case of receiving the pairing request from the robot 100 or any other equipment, the display device 200 can permit an access from the equipment only when the random values received together with the pairing request coincide with the random values included in the two-dimensional code in the display. Thereby, the display device 200 can control the permission of access from the outside in accordance with the displayed substance. Moreover, the security level can be improved.

The constitution for exchanging setting information between the display device 200 and the robot 100 is not limited to the above-mentioned example. The two-dimensional code may be replaced by a barcode or a composite code, for example. The setting information is not limited to an image outputted by the display device 200 but it can be acquired from the outputted voice, or it can be acquired by accepting an input from the user or by a download through a network such as internet. In a case of acquiring the setting information as a result of detecting a voice outputted by the display device 200 at the robot 100 and analyzing the information at the setting unit 111, the frequency of the voice may be within an audible region or an inaudible region. In a case of using a voice in an audible region, it is possible to make the other persons know that the information is exchanged between the display device 200 and the robot 100. In a case of using a voice within the inaudible region, information can be exchanged without being perceived by other persons. The setting unit 111 can receive also the setting information by the infrared ray outputted by the display device 200 that has been detected by the robot 100. In a case of using the infrared ray, information can be exchanged without being perceived by other persons.

The functions of the above-mentioned control unit 102, the behavior control unit 105, the communication unit 101 and the recording unit 107 can be realized by the computer which is built in the robot 100 and executes a predetermined program. A program for allowing the computer to execute the above-mentioned functions and also a recording medium on which the program is recorded are also included in the embodiment of the present invention.

Action Example

Here, examples of actions of the robot 100 will be listed below. The details of the respective actions will be explained also in the subsequent embodiments.

<<Automatic Search for Display Device>>

It is possible for the robot 100 to acquire the shot images around the robot 100 by the detection unit 108 and to detect the cabinet shape of the display device 200 or the rectangle of the screen border included in the acquired shot images, thereby detecting the display screen of the display device 200. The shape data of the cabinet or the screen used as the criteria at the time of detection may have been recorded in advance in the robot 100, or they may be configured to be registered by the user. When detecting a display screen, the robot 100 acquires and analyzes the image inside the display screen, so that it can analyze the image of the content reproduced on the display screen. Thereby, the robot 100 can recognize a part corresponding to the content image among the images photographed by the camera 103. In this manner, the robot 100 can find automatically the display device 200 and view the contents. Further, the robot 100 may be constituted to start the detection action in a case where the idle state continues for a predetermined time period. Thereby, the robot 100 can communicate with the display device 200 not by the external command but by its own decision so as to view the contents.

<<Process of Determining Favorability of Robot with Respect to Content>>

In a case where at least one of a person pattern and an action pattern of person contained in the reference data is recognized in the images of contents detected by the detection unit 108, the decision unit 110 can increase or decrease the value indicating the favorability of the robot 100 with respect to the contents. In this manner, by comparing the pattern of the reference data and the image pattern of the content, the favorability can be calculated. It is possible to assess the content according to the unique preference of the robot 100.

Further, the robot 100 can store as the reference data at least one of the person pattern and the action pattern of the person recognized in the images acquired by the detection unit 108. For example, in a case where a person pattern is detected more often than a predetermined frequency, the person pattern can be included in the reference data. Thereby, the reference data of the robot 100 can be updated in accordance with the environment of the robot 100. That is, the preference of the robot 100 can be updated automatically in accordance with the environment.

The reference data are not limited to the above-mentioned examples. It is also possible to use text data as the reference data and to calculate the favorability of the robot 100 with reference to whether any information corresponding to the text data is included or not in the result of recognition of either the images by the camera 103 or the voices by the microphone 104.

<<Example of Action Based on Assessment made by Decision Unit 110>>

The decision unit 110 can detect the action pattern of person from images detected by the detection unit 108, and the control unit 102 can allow the robot 100 to move in accordance with the action. For example, it is possible for the decision unit 110 to detect a human being by executing a process for recognizing a shape like a person in reproduced images of content video photographed by the camera 103, and then to detect human limbs (skeletal frame). Furthermore, the motions of the limbs can be detected. The control unit 102 can allow the robot 100 to act corresponding to the detected motions of the limbs. For example, when the robot 100 is constituted to have a body and limbs connected to the body movably at joints, it is possible to move the limbs of the robot 100 just like the detected motion of the limbs. Thereby, the robot 100 can mimic the motion of the person in the content video.

The decision unit 110 calculates the value indicating the favorability of the robot 100 with respect to the content, and the robot 100 can control the content being reproduced by the display device 200 or a content to be outputted subsequently, by use of the value indicating the favorability.

For example, when the decision unit 110 calculates a value expressing a preference level for the content and the preference level is below a threshold value, the control unit 102 can send a command of switching the content to be reproduced to the display device 200 through the communication unit 101. When the preference level calculated by the decision unit 110 exceeds the threshold value, the robot 100 may be allowed to act to express pleasure.

In a case where the decision unit 110 judges that the content reproduction by the display device 200 is suspended, the control unit 102 can allow the robot 100 to take a predetermined action, such as an action of expressing anger.

Furthermore, in a case where the decision unit 110 calculates a value indicating a monotony level for a change in at least either the audio or the image of the content being reproduced by the display device 200 and where the monotony level exceeds a threshold value, the control unit 102 can allow the robot 100 to take a predetermined action, such as a dozing action.

Alternatively, the robot 100 can group contents whose values for indicating favorability exceed the threshold value, and the control unit 102 can output information indicating at least one of the grouped contents to the user or to upload to the other computers via the network.

[Variation and Effect]

Irrespective of the above-mentioned examples for robots, the constitutions of robots are not limited to the above-mentioned examples. For example, the robot 100 may not be required to have the function of communicating with the display device 200 and controlling the same. That is, the robot may be constituted to view the contents reproduced by the display device 200 and assess the contents but not to control the display device 200.

In the above-mentioned constitution, it is possible to provide a situation where the display device 200 and the robot 100 work in cooperation with each other, the robot 100 operates autonomously the display device 200 and enjoys the contents. Although photographs and moving images are provided conventionally for amusing human beings, in the above-mentioned constitution, the robot 100 shows a reaction, e.g., it watches the reproduced contents and is pleased. It is also possible to make the robot capture the voice or the facial expression and the like of the user and enjoy the contents together with the user. Therefor, also the human being who is observing the robot that views the contents and reacts thereto will be able to feel happy. For example, when a user living alone is provided with a partner to enjoy together the contents, a healing and stress-relieving effect can be expected. This can be a novel style of communications via robots.

[Example of Use State of Robot]

Figure 2:
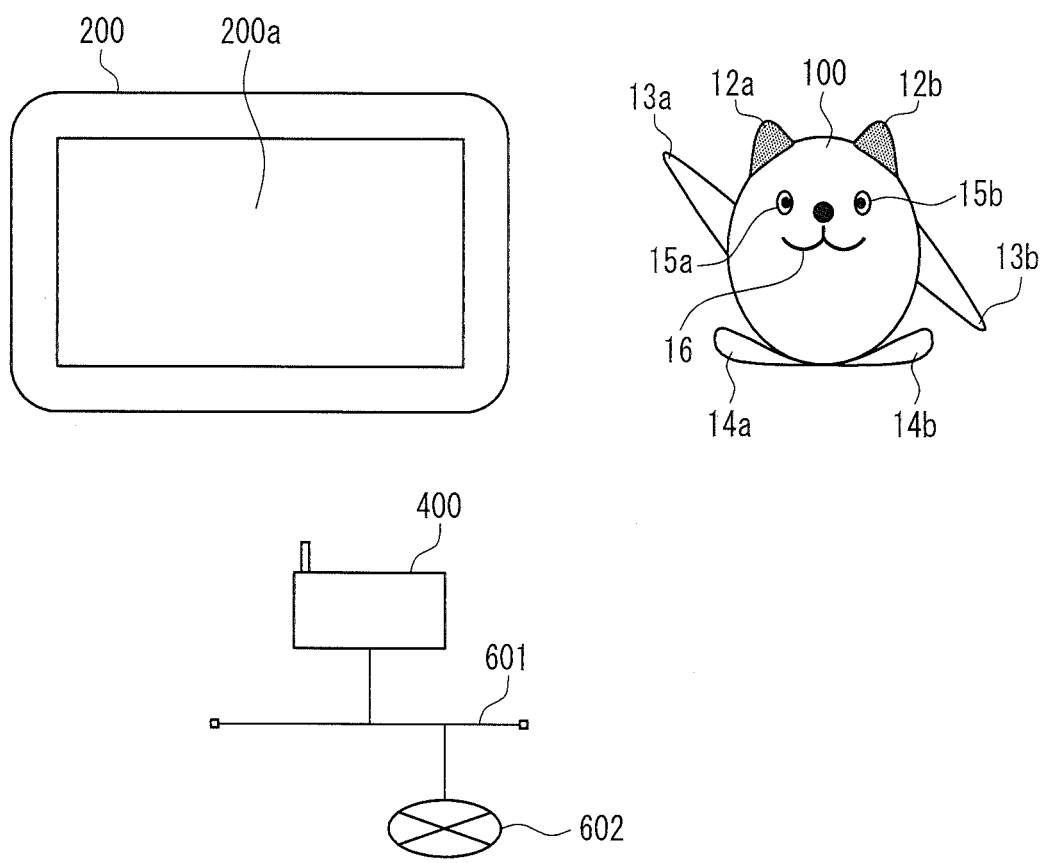
FIG. 2 is a view showing an example of a state of a robot in a use together with a display device.

FIG. 2 shows an example of a state where the robot 100 is used together with the display device 200. In the example as shown in FIG. 2, the robot 100 is used together with a local area wireless network access point 400 and the display device 200 (tablet). The communication unit 101 of the robot 100 and the communication unit 201 of the display device 200 can communicate with each other though the local area wireless network access point 400. The local area wireless network access point 400 may be connected to a wide area network 602 such as internet through a LAN network 601. The local area wireless network access point 400 is an example of a radio-relay system for a display device and a robot, but the relay system will not be limited specifically.

The robot 100 in FIG. 2 has a body 11, arms 13a, 13b and legs 14a, 14b respectively joined to the body 11. The arms 13a, 13b and the legs 14a, 14b are attached movably about the joints as fulcrums to the body 11. The body 11 is further provided with ears 12a, 12b with a built-in microphone 104, eyes 15a, 15b with a built-in camera 103, and a mouth 16. To the arms 13a, 13b and the legs 14a, 14b, an actuator 106 for moving these parts is provided, and to the eyes 15a, 15b and the mouth 16, an actuator 106 for altering the shapes thereof is provided.

Figure 3A:
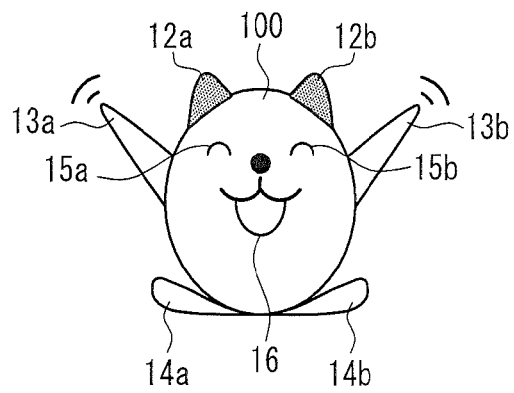
FIG. 3A is a view showing an example of a robot expressing pleasure.
Figure 3B:
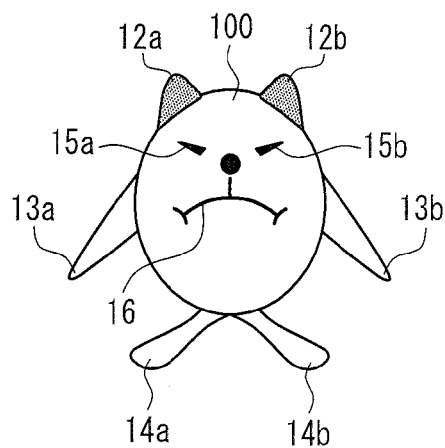
FIG. 3B is a view showing an example of a robot expressing anger.
Figure 3C:
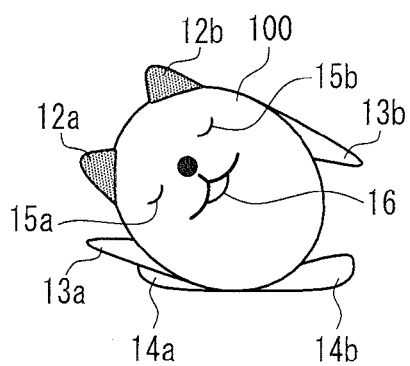
FIG. 3C is a view showing an example of a robot in a dozing state.

FIG. 3A shows an example of a state where the robot 100 expresses pleasure. In the example as shown in FIG. 3A, the robot 100 swings up and down the arms 13a, 13b and opens the mouth 16 so as to express pleasure. FIG. 3B shows an example of a state where the robot 100 expresses anger. In the example as shown in FIG. 3B, the robot 100 tilts the legs 14a, 14b so as to lift the body 11, and further alters the shapes of the eyes 15a, 15b and the mouth 16 so as to express anger. FIG. 3C shows an example of a state where the robot 100 is dozing. In the example as shown in FIG. 3C, the robot 100 is in a state where the body 11 is inclined and alters the shapes of the eyes 15a, 15b and the mouth 16.

Figure 4:
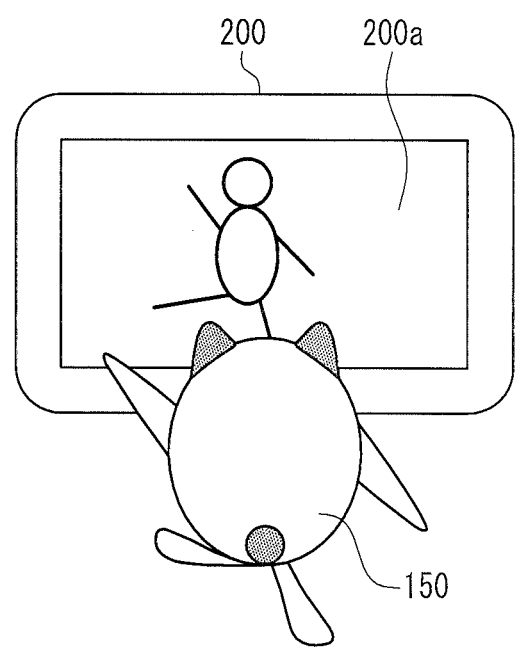
FIG. 4 is a view showing a robot posing in accordance with a pose of a person in an image displayed by a display device.

FIG. 4 shows an example of a state where the robot 100 posing in accordance with the pose of a person in the image displayed by the display device 200. The decision unit 110 of the robot 100 recognizes that the person in the image is posing by raising his/her right hand and right foot, and the control unit 102 controls the motions of the arms 13a, 13b and the legs 14a, 14b so that the robot 100 poses correspondingly by raising its left hand and left foot.

It should be noted that in the example as shown in FIG. 4, the number of articulations of human arms and legs is different from the number of joints of the arms and legs of the robot 100. And, while a human being stands up stably with his/her legs extending perpendicularly, the robot 100 is placed stably with its legs 14a, 14b extending horizontally. In this manner, there may be some differences in the constitutions and actions between the human being and the robot. For example, the robot 100 can be constituted so that data for indicating the correspondence between the motion of the human limbs and the motions of the arms and legs of the robot 100 are recorded in advance and that the data are used to change the recognized motions of the human limbs to the motions of the robot 100.

Figure 5:
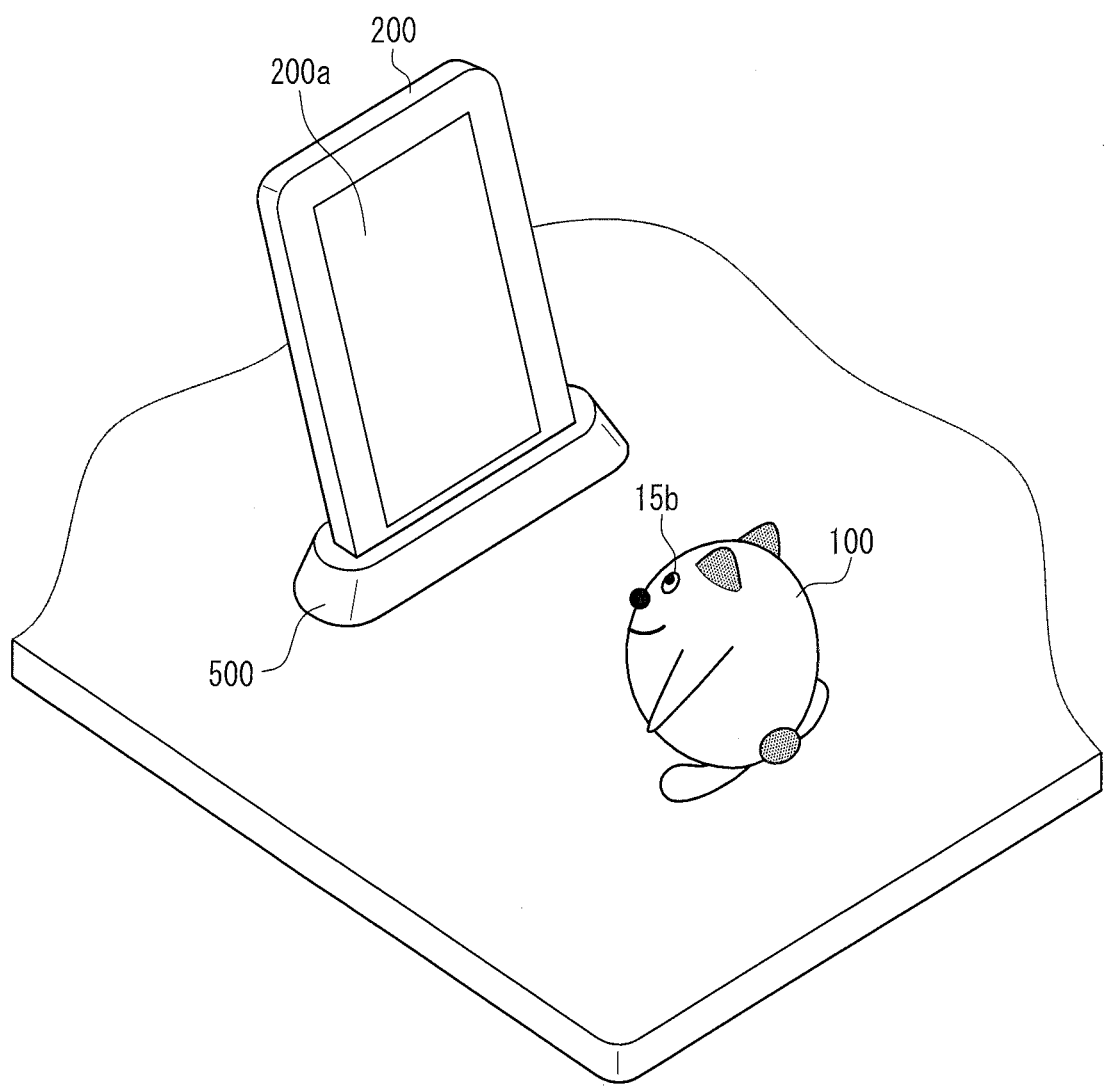
FIG. 5 is a view showing a placement example of a robot and a display device in use.

FIG. 5 shows an example of placement of the robot 100 and the display device 200 in use. In the example as shown in FIG. 5, the robot 100 and the display device 200 are placed side by side on a table and the robot 100 is positioned so that the eyes 15a, 15b will face a display screen 200a of the display device 200. The display device 200 is installed on an adaptor 500, and the display screen 200a is fixed at an angle to the horizontal plane. The adaptor 500 may have also a charging function. Due to the placement as shown in FIG. 5, it is possible to photograph the display screen 200a with the cameras 103 built in the eyes 15a, 15b. For example, it is also possible to fix the legs 14a, 14b of the robot 100 so that the body 11 rotates about the perpendicular direction. Thereby, the robot 100 can rotate the body 11 so as to photograph the circumstance of 360°, and thus it is possible to detect the display screen 200a of the display device 200 in any directions.

The above-mentioned embodiment is an example. The constitution, motion, application and appearance of the robot 100 are not limited to the above-mentioned example.

Embodiment 2

Embodiment 2 is a specific example of a state transition of a robot. The constitutions of the robot and the display device in this embodiment can be substantially the same as those of the above-mentioned Embodiment 1.

In the constitutions as shown in FIG. 1, the decision unit 110 detects a specific external state and internal state as recognition information, such as "User operation was detected", "Interphone rang", "Content was detected", "Good content", and "Weak battery" on the basis of signals from the detection unit 108. The decision unit 110 can determine the behavior of the robot on the basis of the detected recognition information and the state transition information that has been recorded in advance. The state transition information is data for managing the robot's motion for each state. The state transition information can define that the robot transits from one state to another state when meeting a predetermined condition.

Figure 6:
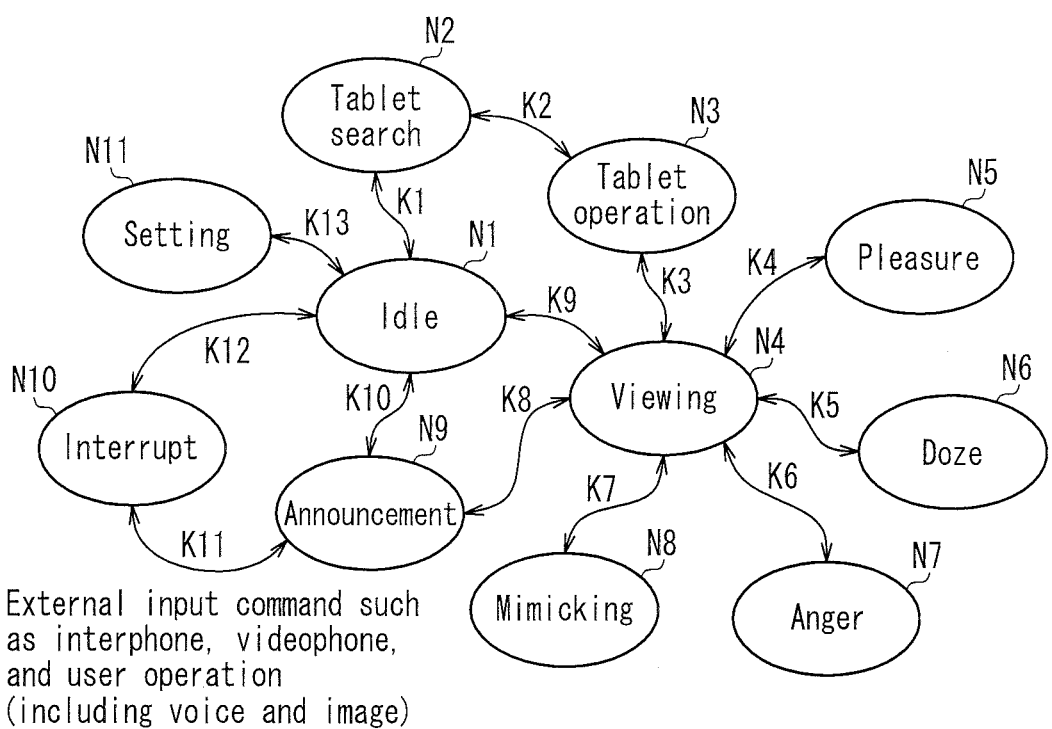
FIG. 6 is a diagram showing an example of substances of state transition information in Embodiment 2.

FIG. 6 shows an example of substances of state transition information in the present embodiment. In the example as shown in FIG. 6, the state transition information includes nodes N1-N11 indicating the robot's state and paths K1-K12 indicating the paths of the state transition between the nodes. For a specific example, a state transition table that has a record of data showing the transitional destination, transitional origin, conditions for transition, and transition rates for the respective paths K1-K12 is recorded as the state transition information in the recording unit 107.

When recognition information is obtained by the signals from the detection unit 108, the decision unit 110 refers to the state transition table recorded in the recording unit 107 and determines at random behavior information indicating the next behavior, and notifies to the behavior control unit 105. Receiving the behavior information, the behavior control unit 105 sends a drive signal based on the behavior information to the actuator 106 so as to move the robot 100. Control by the behavior control unit 105 is not limited to the control of the actuator 106. It is also possible to control the other actions of the robot, for example, reproduction of audio data recorded in advance by the robot 100.

<Example of State Transition in a Case where Robot Searches for Display Device>

In the example as shown in FIG. 6, the robot 100 is capable of controlling autonomously the display device 200. The explanation here refers to a case where the display device 200 is a tablet. For example, the robot 100 being in an idle state (standby state) monitors events at established intervals or waits for an interrupt from the outside. When the idle state continues for a predetermined time period, the decision unit 110 of the robot 100 recognizes boredom. Here, in a case where a condition for the transition of the path K1, namely the transition from the idle state (node N1) to a tablet search (node N2) is "recognizing boredom", with the transition probability of the defined path K1, the state of the robot 100 transits to the tablet search (node N2) (the details of the search process will be described later).

In the tablet search of the node N2, in a case where the tablet is found, the control unit 102 operates the tablet via the communication unit 101 so as to allow the tablet to reproduce the content. At that time, it is possible to control to reproduce preferentially an un-reproduced content among the contents included in the content list sent from the tablet (the specific example of the content list will be described later). When the content is reproduced and the decision unit 110 decides "Content was detected" on the basis of the information from the camera 103, the robot 110 transits to a viewing state (node N4). By defining the state transition table in this manner, it is possible for the robot 100 to reproduce the contents preserved in the tablet on its own will without a command from the outside and to react according to the preference of the robot 100.

<<Action Example at the Time of Searching for Display Device>>

For example, the control unit 102 controls the orientation of the body of the robot 100 and the camera 103 and analyzes signals obtained by the camera 103 so that the process of searching for the display device 200 can be executed. Specifically, the control unit 102 takes photos with the camera 103 while carrying out at least one of the actions 1)-3); 1) pan-tilting the camera; 2) switching the zoom ratio of the camera; and 3) rotating the robot body about the perpendicular direction. The decision unit 110 detects the outer frame of the display device 200 or the quadrangle of the display screen through a process of recognizing the image obtained in the photographing. When the decision unit 110 detects the outer frame of the display device 200, the control unit 102 adjusts the position and the pose of the camera 103. Thereby, it is possible to photograph the display screen of the display device 200 with the camera 103 and to acquire the video of the contents reproduced by the display device 200.

It should be noted that the search process is not limited to the above example. Alternatively for example, it is possible to execute the process of identifying the orientation of the display device 200 by using a sound reception signal from the microphone 104 in place of or in addition to the action of the camera 103 as mentioned above. For example, by using a microphone array for the microphone 104, the decision unit 110 is capable of presuming the direction of the sound source on the basis of the sound reception signal from the microphone 104. The control unit 102 controls the robot 100 so as to orient the camera 103 to the presumed sound source, and thereby the decision unit 110 can detect the quadrangle of the outer frame of the display device 200 from the image obtained by photographing the orientation. Furthermore, it is possible for the decision unit 110 to detect the sound of a predetermined frequency originated from the display device 200, thereby presuming the position of the display device 200. It is preferable that this frequency is out of the region audible for human beings.

<<Specific Example of Content List>>

In the tablet operation of node N3, the robot 100 operates the tablet so as to acquire from the tablet a content list that indicates reproducible contents. The robot 100 sends a content list request to the tablet through the communication unit 101 for example, and according to this request, the tablet sends a content list to the robot 100 through the communication unit 201.

A display device 200 like a tablet records contents such as photos and moving images in the storage unit 204. The reproduction unit 210 of the display device 200 records a content list for managing the contents in the storage unit 204. Alternatively, the content list may be preserved in the storage unit 204. FIG. 7 shows an example of such a content list. As shown in FIG. 7, the content list includes file names, the dates and times, and content IDs allocated for contents identification. Further, an unviewed flag can be included. The unviewed flag is information indicating whether the content has been reproduced at least once or not.

The information of the content acquired by the robot 100 is not limited to the above-mentioned content list. For example, if the display device 200 is a television set, the robot 100 may acquire EPG.

<Example of State Transition from Viewing State>

In the example as shown in FIG. 6, in the viewing state (node N4), the robot 100 detects at the detection unit 108 the video and the audio reproduced by the tablet, and executes at the decision unit 110 an assessment of the contents on the basis of the information obtained by the detection unit 108. Examples of the content assessment include calculation of values indicating favorability or aversion of the robot with respect to the content, calculation of values indicating the monotony level of the content, or the change level. Other examples of the content assessment include judgment whether the content includes a predetermined substance or not, judgment whether the content reproduction was suspended or not, whether the content reproduction has been completed or not, and whether or not the screen of the display device to reproduce the contents offsets from the visual field of the camera 103. Namely, the content assessment made by the decision unit 110 includes judgment on the contents.

The destination for transition from the node N4 can be determined with reference to the result of content assessment made by the decision unit 110. Regarding the paths K3-K9, for example, transition conditions as indicated in the table below can be set in a state transition table.

In the path K3, in a viewing state, in a case where the value of favorability calculated by the decision unit 110 is below the lower threshold value D, the control unit 102 allows the state of the robot 100 to transit to the tablet operation (node N3) with probability P3, and allows the tablet to reproduce a different content. In the path K5, in a viewing state, when the decision unit 110 recognizes that monotonous images have continued, the control unit 102 controls the robot 100 to doze with probability P5. In the path K6, in a viewing state, when the decision unit 110 recognizes that the content reproduction is suspended, the control unit 102 controls the robot 100 to express anger with probability P6. In the path K7, in a viewing state, in a case where the decision unit 110 recognizes a person taking a predetermined pose in the images of the contents, the control unit 102 controls the robot 100 to pose corresponding to this pose with probability P7.

The condition for transition from each of the nodes N5-N8 to the viewing state of node N4 can be for example a predetermined time course. Alternatively, the condition from a dozing state (node N6) to the viewing state (node N4) can be set to a decision by the decision unit 110 that the content video is not monotonous. The details of the process of the above-mentioned decision made by the decision unit 110 will de described later.

The processes in the respective states of the above-mentioned nodes N2-N8 can be executed as the processes of the viewing application. In this case, it is regarded that, when the robot 100 is in any of the states of nodes N2-N8, the viewing application is activated.

<Other State Transition Example>

<<Setting>>

When the robot 100 is in an idle state (node N1), in a case where the setting of the display device 200 is instructed by an operation of the user, the robot 100 transits to a setting state (node N11), and returns to the idle state (path K13) after the setting process is completed. The control unit 102 for

TABLE 1

| Path | State transition | Transition condition | Probability |
|---|---|---|---|
| ... | ... | ... | ... |
| K9 | Viewing N4→Idle N1 | Reproduction of N-number of contents is completed continuously | P9 |
| K3 | Viewing N4→Tablet operation N3 | Favorability was below threshold value D | P3 |
| K4 | Viewing N4→Pleasure N5 | Favorability exceeded threshold value U; predetermined person was detected in content image | P4 |
| K5 | Viewing N4→Doze N6 | Monotonous moving images continued | P5 |
| K6 | Viewing N4→Anger N7 | Content reproduction was suspended | P6 |
| K7 | Viewing N4→Mimic N8 | Person taking a predetermined pose was detected in content image | P7 |
| ... | ... | ... | ... |

In the state transition table example as indicated in the above Table 1, the path K4 is recorded. The path K4 is data indicating that the condition of transition from a viewing state (node N4) to a pleasure state (node N5) is "Favorability exceeded threshold value U, or predetermined person was detected in content image". Thereby, in a case of viewing a preferred content or finding a predetermined person (e.g., the user and the family member) in the content image, the robot 100 can act to express pleasure with probability P3.

According to the above-mentioned state transition table example, in the path K9, in a viewing state, when the decision unit 110 judges that N number of contents (N is a natural number) are completed sequentially, the control unit 102 turns the robot 100 back to the idle state (nodes N1) with probability P9.

example activates the setting application so as to transit the robot 100 to the setting state and to allow the robot to execute the setting process. A specific example of the setting process will be described in Embodiment 3.

<<Interrupt, Announcement>>

In the idle state (node N1), in a case where the decision unit 110 of the robot 100 detects an interrupt on the basis of the information obtained by the detection unit 108, the robot 100 transits to an interrupt state (node N10) (path K12). The detection of interrupt may be a detection of an external input command such as detection that an interphone rang, detection that videophone was received, detection of user operation (including voices and images) for example. Alternatively, it may be a detection of the internal state such as weak battery.

As to the transition from the interrupt state (node N10) to the announcement state, for example, the decision unit 110 can decide according to the type of the interrupt state. For example, if the interrupt has been preset as an interrupt to be notified to the user, such as the above-mentioned interphone, the reception of videophone and weak battery, the control unit 102 can allow the robot 100 to output a voice for example in order to notify to the user.

The state transition will not be limited to the embodiment for the state transition as mentioned above in detail.

Embodiment 3

Figure 8:
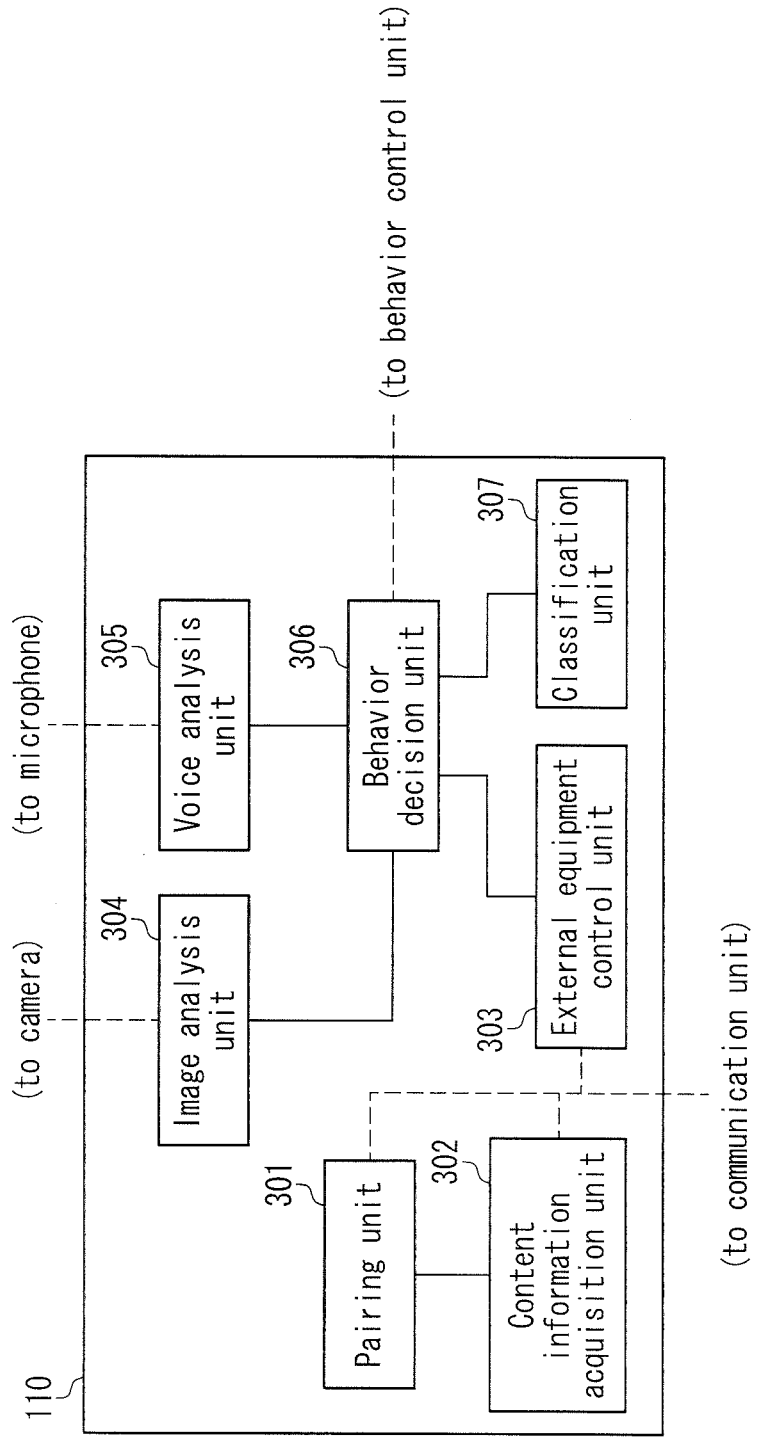
FIG. 8 is a functional block diagram showing an example of a more detailed constitution of a decision unit in Embodiment 3.

Embodiment 3 is a specific embodiment of a setting function for enabling communications between the display device 200 and the robot 100. FIG. 8 is a functional block diagram showing an example of a more detailed constitution of the decision unit 110 in Embodiment 3. As to the external constitution of the decision unit 110, it can be substantially the same as that of at least either Embodiment 1 or 2.

The decision unit 110 as shown in FIG. 8 has a pairing unit 301, a content information acquisition unit 302, an external equipment control unit 303, an image analysis unit 304, a voice analysis unit 305, a behavior decision unit 306 and a classification unit 307.

The pairing unit 301 acquires setting information necessary for the robot 100 to communicate with the display device 200, and records the information. The pairing unit 301 has a function corresponding to that of the setting unit 111 in the above-mentioned Embodiment 1. In Embodiment 1, the setting unit 111 and the decision unit 101 are provided respectively as separate functional blocks, while in the present embodiment, the pairing unit 301 that has a function corresponding to that of the setting unit 111 works as a part of the decision unit 101.

The pairing unit 301 exchanges information necessary for communications between the robot 100 and the display device 200 and records respectively the information, thereby enabling the communications therebetween.

The content information acquiring unit 302 acquires information indicating the content that can be reproduced by the display device 200 in accordance with the instruction from the robot 100. For example, the content information acquiring unit 302 can request a content list to the display device 200, and receive the content list as a response to the request.

The image analysis unit 304 analyzes images photographed by the camera 103 and notifies the analytical result to the behavior decision unit 306. The voice analysis unit 305 analyzes voices received by the microphone 104 and notifies the analytical result to the behavior decision unit 306. Receiving the image analytical result and the voice analytical result, the behavior decision unit 306 determines the behavior of the robot 100 on the basis of the results, and sends information of the determined behavior to the behavior control unit 105. According to this constitution, the external state of the robot 100 can be detected by the image analysis unit 304 and the voice analysis unit 305, and on the basis of the external state, the behavior decision unit 306 can generate behavior information.

Here, the external state may include information concerning the contents reproduced by the display device 200. Namely, the image analysis unit 304 and the voice analysis unit 305 detect information concerning the contents, and the behavior decision unit 306 assesses the contents on the basis of the information. Examples of the information concerning the contents include information indicating whether the detected image/audio is the reproduced content, and information expressing an object to be recognized (or extracted) such as a person included in the content, a specific matter or a specific word, and also states such as the pose, motion, arrangement, feature quantity and the like of the recognized object.

Assessment of the contents can be executed on the basis of the reference data of the robot 100 similarly to the above-mentioned Embodiments 1 and 2. For example in either the image analysis unit 304 or the voice analysis unit 305, extraction of the object such as a person included in the content may be carried out by use of the reference data. That is, content assessment unique to the robot 100 will be available also by extracting an object from the content on the basis of the reference data and assessing the content on the basis of the object.

The external equipment control unit 303 controls through the communication unit 101 the output of the content by the display device 200. The external equipment control unit 303 controls the external equipment on the basis of the behavior determined by the behavior decision unit 306 for example.

The classification unit 307 classifies the contents on the basis of the content assessment made by the behavior decision unit 306 and outputs the classification result.

[Action Example of Pairing]

Figure 9:
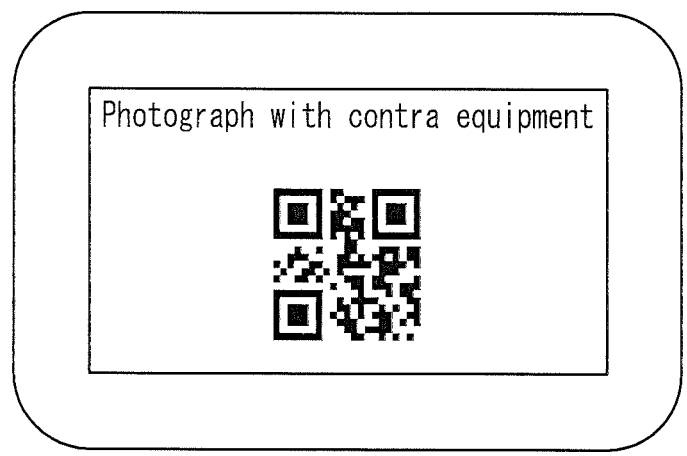
FIG. 9 is a view showing an example of a screen displayed in a display device in a pairing procedure.
Figure 10:
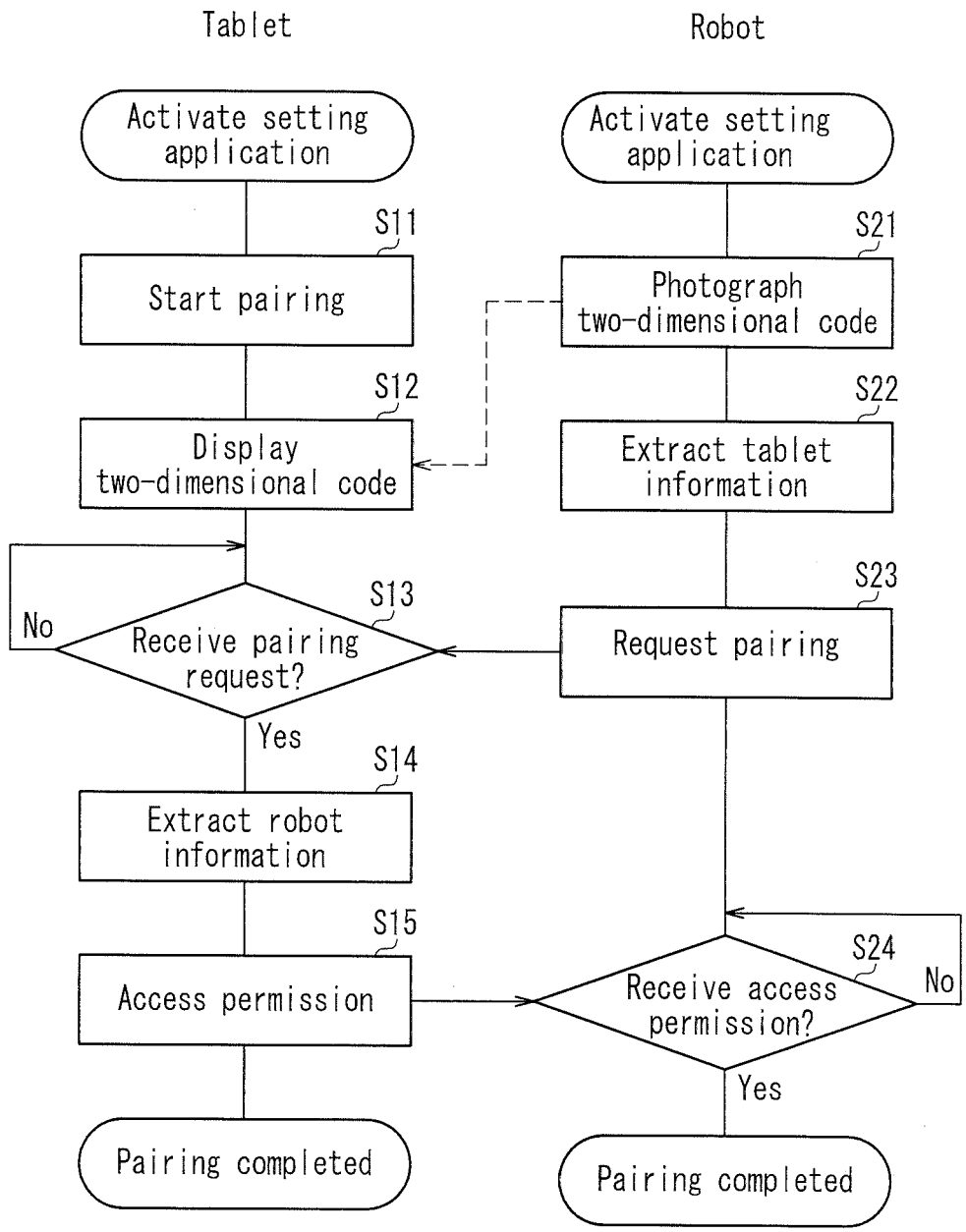
FIG. 10 is a flow chart showing an example of a pairing process in a display device and a robot.

FIG. 9 shows an example of screen displayed by the display device 200 in a pairing procedure. FIG. 10 is a flow chart showing an example of a pairing process in the display device 200 and in the robot 100. The following description refers to a case where the display device 200 is a tablet.

In the example as shown in FIG. 10, first, in the tablet, a setting application is activated by the user's operation. The tablet where the setting application is being activated starts pairing (S11) by the user's instruction, and displays a two-dimensional code on the tablet's screen (S12). For example, the two-dimensional code as shown in FIG. 9 is displayed on the screen of the tablet. The tablet displays also a message to the user for the purpose of urging the user to allow the robot 100 to photograph this two-dimensional code. Later, the tablet waits for a pairing request from the robot 100 (S13).

When looking at this display, the user activates the setting application of the robot 100, operates the robot 100 so as to photograph the two-dimensional code (S21). The robot 100 extracts from the photographed two-dimensional code the information of the tablet, e.g., the IP address of the tablet (S22). The robot 100 sends a pairing request to the destination of the IP address of the tablet (S23). The pairing request may include information concerning the robot 100. After sending the pairing request, the robot 100 waits for a response from the tablet (S24).

Receiving the pairing request (Yes in S13), the tablet extracts information concerning the robot 100 included in the pairing request, such as the IP address of the robot 100 and the name of the robot 100 (S14). The tablet sends to the robot 100 a signal or data for expressing permission of access (S15).

The robot 100 receives from the tablet a notification of access permission (Yes in S24), and thus the pairing is completed. Thereby, the robot 100 and the tablet have connection information for each other, and communications therebetween become available.

Here, the two-dimensional code may include a random value (numerical value or a character string). In this case, the robot 100 sends the random value included in the readout two-dimensional code to the tablet, together with the pairing request. Only when the random value received together with the pairing request of the tablet is equivalent to the random value of the two-dimensional code displayed by the tablet itself, an access by the robot that has requested the pairing is permitted. Thereby, it is possible to prevent an error of permitting any pairing request from other equipment that has not photographed the tablet screen.

Alternatively, the robot 100 can encode the pairing request by turning the readout random value to an encryption key and notifying it to the tablet. The tablet permits access to the sender of the pairing request in a case where the pairing request can be decrypted. Thereby, it is possible to prevent equipment other than the robot 100 from pairing easily with the tablet.

Embodiment 4

Embodiment 4 is a specific example of a constitution for the robot 100 to assess the contents reproduced by the display device 200. For the constitution of the robot 100, a constitution similar to any one of Embodiments 1-3, or a combination of two or three thereof can be employed. Hereinafter, as one example, for a robot constituted by combining the robots 100 of Embodiments 1-3, the functions will be described in details.

Figure 11:
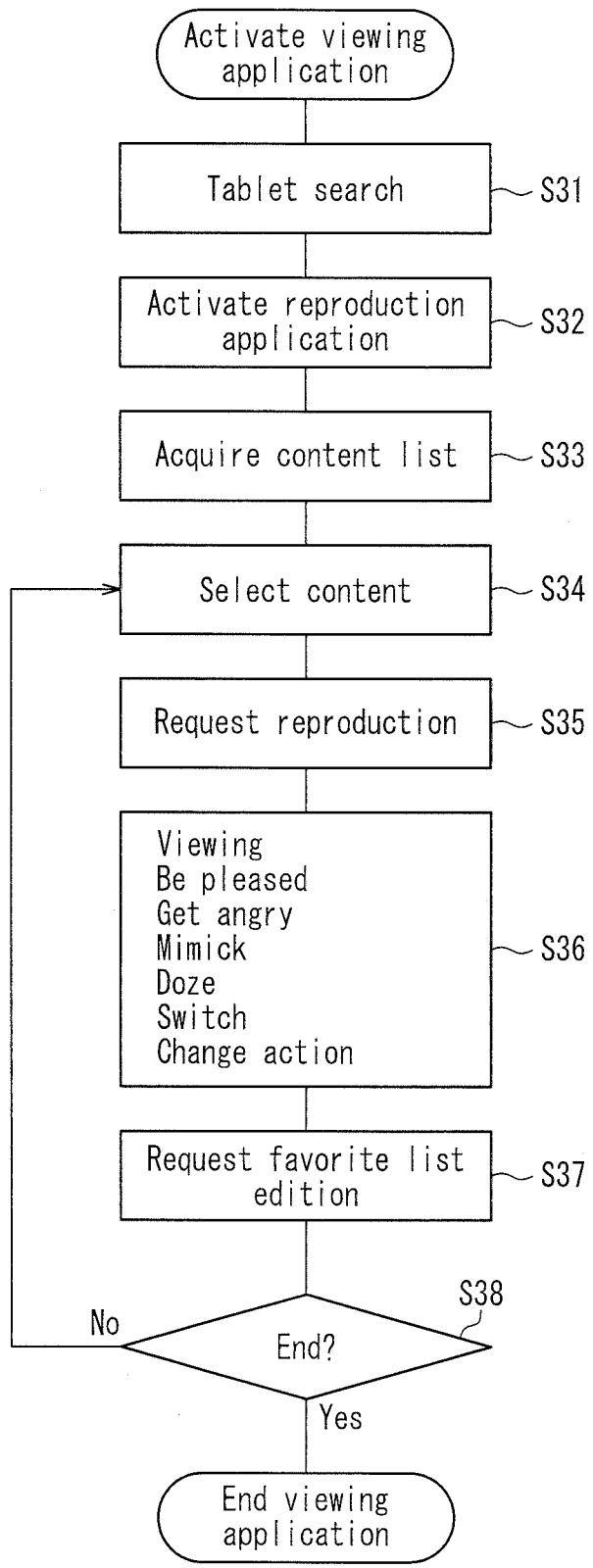
FIG. 11 is a flow chart showing an example of a process after activating a viewing application of a robot in Embodiment 4.

FIG. 11 is a flow chart showing an example of a process after activating the viewing application of the robot 100 in the present embodiment. In the example as shown in FIG. 11, the robot 100 first searches for the tablet (an example of the display device 200) (S31). The search action can be performed for example similarly to the above-mentioned Embodiments 1 and 2.

In a case where the quadrangle of the frame of the tablet has been detected as a result of the analysis at the image analysis unit 304, the behavior decision unit 306 instructs the external equipment control unit 303 to activate the reproduction application of the tablet (S32). The content information acquisition unit 302 requests a content list to the tablet, and receives the content list as the response from the tablet (S33).

For the content list, for example what is similar to the list as shown in FIG. 7 can be used, though there is no specific limitation thereto. The external equipment control unit 303 selects a content to be reproduced among the contents included in the content list (S34). The external equipment control unit 303 can select preferentially an unviewed content for example (a content of a record at which any unviewed flag does not stand). The contents may be selected at random. Further, it is possible to accept an input of content selection from the user. In such a case, for example, it is also possible to facilitate learning the user's preference on the basis of the selection history of the user.

The external equipment control unit 303 sends the request for reproducing the selected content to the tablet (S35).

When reproduction of the content starts at the tablet, the robot 100 starts a viewing process (S36). In the viewing process of S36, for example, the image analysis unit 304 of the robot 100 analyzes the reproduced image of the content detected by the camera 103, and the voice analysis unit 305 analyzes the reproduced voice of the content received by the microphone 104. The behavior decision unit 306 assesses the content in light of the reference data on the basis of the analytical results.

The behavior decision unit 306 determines the behavior of the robot 100 on the basis of the assessment result on the contents. Examples of the behaviors to be determined here include "be pleased", "get angry", "mimic", "doze", "switch", "change action" and the like. The action of "be pleased" corresponds to a case where for example the content is assessed as preferred by the robot. The action of "get angry" corresponds to a case where for example it is judged that reproduction of the content was suspended. The action of "mimic" corresponds to a case where for example it is judged that in the content image there is an action pattern matching the pattern of the reference data. The action of "doze" corresponds to a case where for example the content is assessed as monotonous. The action of "switch" corresponds to a case where for example the content is assessed as not being preferred by the robot 100. "Changing action" corresponds to a case where for example it is assessed that the content reproduction is too slow or too rapid. Specific examples of the process for content assessment will be described later.

After the behavior decision unit 306 detects the end of the content reproduction, the classification unit 307 classifies the completely reproduced contents and outputs the classification result (S37). In the example as shown in FIG. 11, the behavior decision unit 306 determines on the basis of the favorability value whether to add the content to the favorite or not. In a case of adding it to the favorite, the external equipment control unit 303 sends a request (edition request) for addition to the favorite list managed by the tablet.

The robot 100 repeats the processes of the above-mentioned S34-S37 until no unviewed contents remain (until the result becomes Yes in S38). Hereinafter, specific examples of the functions of the image analysis unit 304, the voice analysis unit 305 and the behavior decision unit 306 in the above-mentioned S36 will be described.

<<Example of Process for Assessing Preference of Robot>>

The behavior decision unit 306 can assess the preference of the robot 100 with respect to the content by calculating the value (score) representing the favorability (preference level) of the robot 100 with respect to the content for example. The favorability can be calculated for example on the basis of a collation result by the image analysis unit 304 between the content image and the pattern of the reference data.

For example, the image analysis unit 304 decides whether a pattern corresponding to the pattern of the reference data is included in the images of the reproduced contents. Here in a case where it is regarded that the pattern of the reference data is included in the content images, the behavior decision unit 306 can update the value for raising the favorability. Thereby for example, by registering image patterns of the faces of the user of the robot 100 and his/her family members, it is possible to raise the favorability of the robot 100 when the faces are included in the content images.

Furthermore, it is possible to store data indicating the timing at which the image pattern is detected with the camera 103 together with the image pattern of the reference data, and to use the data for calculating the favorability. For example, it is possible to store the patterns of the faces of the user and of the family who have been registered as the reference data in association with data indicating the timing at which the patterns were recognized in the images photographed formerly by the camera 103. In this case, recognizing the facial pattern of the user in the images of the contents, the behavior decision unit 306 adjusts the change amount of the favorability in accordance with the timing at which the user was recognized. In other words, the favorability (or the pleasure level) can be changed depending on when the robot 100 sees the user last time, either recently or long time ago. For example, it is possible to raise the favorability with respect to a face the robot sees after a long time.

It should be noted that the storage of reference data and decision of behavior using the same are not limited to application to assessment of contents. For example, they can be used also for determining behavior of the robot 100 such as expression of emotions. The robot actually stores image patterns of a person photographed by the camera 103, and when recognizing the person in the images (which are not limited to content images) of the camera 103, collation with the stored pattern is carried out so that the behavior can be determined on the basis of the collation result. Thereby for example, it is possible for the robot 100 to express a great deal of pleasure with respect to a person whom the robot meets after a long time, or to express excessive familiarity to a person whom the robot meets at frequent intervals. Namely, not only the contents but assessment and judgment with respect to an actually photographed person can be carried out on the basis of the criteria unique to the robot 100.

The reference data are not limited to the above-mentioned image pattern of a specific person. For example, data to provide criteria for deciding a smile level of a human face can be applied as well. Furthermore, for providing the robot 100 with a character as a boy, also it is possible to store in advance videos and audios of automobiles and trains as reference data. For providing the robot with a character as a girl, also it is possible to store in advance videos and audios of flowers and pets as reference data.

<<Process for Robot to Detect Motion or Pose>>

The robot 100 can recognize a person included in a content image, detect human limbs (skeletal frame) and furthermore detect the motion of the limbs or the pose. The patterns of the motions of the human limbs or the poses can be stored as reference data. The behavior decision unit 306 collates the patterns stored as the reference data with the motions and poses of a person recognized in the content images being reproduced, and thus it is possible to make an assessment unique to the robot with respect to the motions and poses of the person in these content images.

For example, in a case where motions or poses matching the patterns of the reference data are detected in the content images, the favorability with respect to the content can be raised. Further, the robot 100 can react to the motions and poses of the person detected from the content images at a frequency higher than a predetermined level.

Moreover, in a case where the image analysis unit 304 detects in the content image what matches the motion or the pose in the reference data, the behavior decision unit 306 can act to mimic the motion or the pose. For example, the robot 100 can act to mimic a pose or a motion that appears frequently in the content images. Thereby, the possibility that the robot 100 performs motions that are not expected by the user becomes high, which can amuse the user.

Not only the motion and/or the pose of the person in the images but other patterns such as the pattern of the feature quantity of voice can be recognized and mimicked by the robot 100 similarly. For the pattern recognition of the robot 100 regarding the motions and poses of the persons in the content images, excellent correctness is not always required. In contrast, on occasions, misrecognition at appropriate frequency allows the user to find a humanlike behavior of the robot 100.

<<Example of Process to Detect Suspension of Content Reproduction during Viewing>>

The image analysis unit 304 can detect suspension of content reproduction by capturing a characteristic change in the images of the reproduced contents. For example, in a case where a menu screen of the tablet appears suddenly in the photographing screen of the camera 103, it can be decided that the content reproduction has been cancelled. Other than this menu screen, appearance of basic screen displayed when the tablet is in a state of waiting for the user's instruction (idle state), such as a desktop screen or a default screen, can be recognized as a characteristic change.

In a case where suspension of content reproduction is detected, as mentioned above, the robot 100 can act to express anger.

<<Example of Process of Detecting that the Content being Viewed is Monotonous>>

In a case where no pattern that matches the predetermined pattern is detected in either the image or the audio in the content by the image analysis unit 304 for a certain time period, the behavior decision unit 306 can decide that the content is monotonous. The predetermined pattern can be for example a figure or a face of a person or the like. When the content is decided as monotonous, the behavior decision unit 306 allows the robot 100 to "doze".

<<Example of Process to Detect that the Number of Changes in the Content Images being Viewed is Small>>

In the reproduced contents, in order to detect that similar images come one after another, for example, comparison by use of quadtree representation can be used. Specifically, the image analysis unit 304 calculates the change amount of the images of the contents photographed with the camera 103 by use of the quadtree representation, and in a case where images whose change amount is smaller than the threshold value continues for a predetermined time period, the behavior decision unit 306 can judge that similar images continue.

In a case where the behavior decision unit 306 decides that similar images continue, it is possible to control the display device 200 to decrease the display intervals between the images through the external equipment control unit 303 and the communication unit 101. Thereby, it is possible to control the reproduction speed of the content images in accordance with the change level of the content images.

Embodiment 5

Embodiment 5 is a specific example of a content classification process performed by the classification unit 307. The classification unit 307 classifies the contents on the basis of assessment made by the decision unit 110. Classification of contents can be executed by, for example, determining to which group the content viewed by the robot 100 belongs. This determination can be made by the decision unit 110, based on the favorability (preference level) of the robot with respect to the content. Alternatively, the contents can be classified in accordance with the result of matching between the reference data and the contents.

[Example of Classification Process]

An example of simple classification processes is a process of deciding whether or not to add a content to favorites of the robot. For example, if the favorability of the robot 100 with respect to the content calculated by the decision unit 110 exceeds the threshold value, the classification unit 307 is able to determine to add the content to favorites; if the favorability does not exceed the threshold value, the content is not added to the favorites.

As another example of classification process, for example, the classification unit 307 can make a classification by putting a tag to express assessment such as interesting and boring with respect to the content viewed by the robot 100. Similarly in this case, the tag can be determined based on the assessment made by the decision unit 110. For example, as an assessment made by the decision unit 110, the tags to be attached can be determined by using the above-mentioned favorability, the monotony level, and the level of image change.

As an even further example of classification process, it is possible to classify the contents on the basis of the result of collation between the reference data and the contents. Specifically, the classification unit 307 can group the contents so that groups of contents including patterns equal to the patterns of the reference data will belong to the same group. For example, contents of the images including a person or a pose equal to the person or the pose registered in advance as reference data can be classified in the same group. The classification unit 307 can collect images where a person poses just as the pose that the robot 100 newly memorizes, and make them as one group. Or the classification unit 307 may classify automatically photographs on which a specific person is included as one group.

[Example of Output of Classification Result]

It is preferable that the robot 100 has a function of appealing to the outside the result of classification made by the classification unit 307. Examples of the actions of the robot 100 to appeal its classification include 1) speaking to the user; 2) drawing attention of the user; 3) raising the frequency of reproducing the content classified as favorite; and 4) uploading the classification result automatically on the Web page.

In the embodiment of 1) and 2), for example, the classification unit 307 can classify automatically images including a family as one group, and the robot 100 can act to appeal the images of the group classified by the classification unit 307 toward the family, by outputting the voice of "Look, Look!". In the embodiment of 3), the external equipment control unit 303 that controls content reproduction conducted by the display device 200 can reproduce some contents, which have been classified as favorites according to the classification result by the classification unit 307, at a frequency higher than the other contents. As a specific example of 4), robots may exchange information on their favorite contents by SNS.

In another embodiment for example, the classification unit 307 can update the favorite list recorded by the display device 200. In such a case, the reproduction unit 210 of the display device 200 can have a mechanism to register contents of favorites for each user. Specifically, it is possible to record in the storage unit 204 a list indicating contents of favorites of each user as "favorite list". The favorite list is created for each user, and content ID and accessory information are recorded for each favorite content of the user. Examples of the accessory information include the number of reproductions, and the date and time of the last reproduction. FIG. 12 shows an example of such a favorite list.

The favorite list, namely data indicating the content classification result may not be always included in the display device 200.

Due to the classification function as mentioned above, the robot 100 views the contents, and as a result, information of contents classified according to the preference unique to the robot 100 is obtained. For example, it is possible to create a favorite folder or a favorite list according to the preference of the robot 100 and to organize the contents in accordance with the preference of the robot 100. Thereby for example, some contents of a trend unimaginable for the user may be collected in the favorite list, and thus they can amuse the user.

Embodiment 6

Embodiment 6 is a variation of reference data used by the robot 100 for the purpose of assessment. The reference data of the present embodiment can be applied to any of Embodiments 1-5 or any combination thereof.

The form of the reference data is not limited to particular ones but it can be made as pattern data to serve as a template at the time of image recognition, voice recognition or motion recognition. The pattern data include for example, images, voices, texts, data to indicate motion patterns of limbs, and data to indicate poses of a person.

The reference data can include data recorded in advance on the recording unit 107 at shipping of the robot 100. Alternatively, the user may input the reference data into the robot 100. In place of or in addition to the user input, the robot may be constituted to store the reference data autonomously by collecting information from the outside. For example, the robot 100 can acquire data such as images, voices and texts included in a predetermined folder of the display device 200 and use the acquired data as the reference data directly or after processing.

Figure 13:
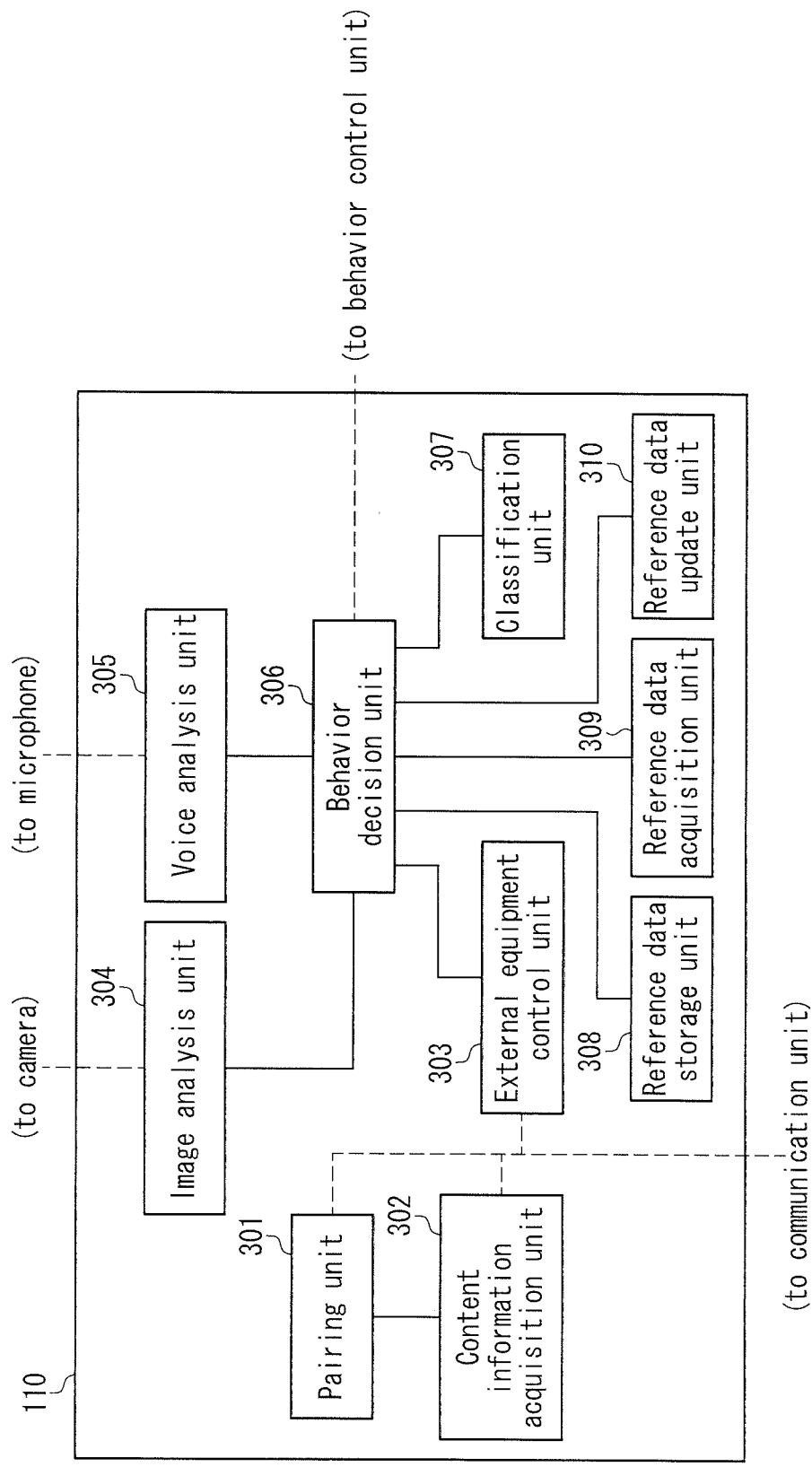
FIG. 13 is a functional block diagram showing an example of a constitution of a decision unit in Embodiment 6.

FIG. 13 is a functional block diagram showing an example of a constitution of the decision unit 110 in a case where the robot 100 has a reference data storage function. In the example as shown in FIG. 13, the decision unit 110 includes further a reference data storage unit 308, a reference data acquisition unit 309, and a reference data update unit 310.

The reference data storage unit 308 stores in the recording unit 107 the recognition result of the information acquired at the detection unit 108 as the reference data. The reference data storage unit 308 can store as the reference data at least one of the person and the motion pattern of the person recognized in the images of the camera 103, for example. It is not necessarily required that the reference data storage unit 308 stores as the reference data all of the recognition results, but it may extract a recognition result to be recorded as the reference data on the basis of the occurrence frequency or may extract at random. For example, pattern data of face(s) of person(s) recognized frequently in the images of the camera 103 (e.g., the user and/or the family member) are recorded as the reference data, so that it can provide criteria for assessment to decide whether or not any person familiar with the robot 100 is included in the contents.

The reference data acquisition unit 309 acquires data that have been recorded in the display device 200 through the communication unit 201 or data that have been recorded in the location indicated by information recorded in the display device 200, as the reference data. For example, the reference data acquisition unit 309 can acquire still images, music files, moving image files and the like in the user folder recorded in the display device 200 and record them as the reference data in the recording unit 107. Thereby, it is possible to associate the preference of the user of the display device 200 with the preference of the robot 100.

It is also possible to acquire the reference data from any other unit/device than the display device 200. For example, it is possible for the reference data acquisition unit 309 to acquire information to access to contents reproduced with reference to the content reproduction history or the like of the user of the display device 200, to access to the contents so as to capture as the reference data the content directly or pattern data extracted from the content into the robot 100, and to record the content in the recording unit 107. Alternatively, in a case where a browser (an example of program to execute the content display) has been installed in the display device 200, it is possible for the reference data acquisition unit 309 to acquire URL included in the preference list of the browser and/or URL included in the access history, and to access to the location indicated by these URL (information indicating the location of the content) so as to download images, text files and the like to the robot 100.

It is not necessarily required that the reference data are recorded in the robot 100. For example, the robot 100 can make assessment by using reference data recorded in the storage unit 204 of the display device 200. In another constitution, the robot 100 receives an assessment result made by the display device 200 by use of the reference data stored in the storage unit 204.

The reference data update unit 310 updates the reference data on the basis of the content assessment made by the decision unit 110. For example, it is possible to associate and record an assessment result made by the decision unit 110 and reference data that have been used to obtain the assessment result and determine the necessity of the reference data according to the result whether the assessment result satisfies a certain condition or not. Thereby, automatic optimization of the reference data becomes possible. For example, if unfavorable assessment results are obtained successively more than a predetermined number of times or the frequency to be used for assessment is low, the reference data will be deleted. Alternatively, it is possible to update the score in accordance with the assessment result in a case of recording the reference data with the score. For example, in a case where the reference data are image patterns and recorded together with the favorability score, it is possible to add the favorability score of the image patterns every time the assessment process using the image patterns is executed. This allows automatic transition of the preference of the robot 100. For example, the more the robot 100 watches the image patterns, the more the robot 100 loves the image patterns.

The present invention is not limited to the example of the constitution as shown in FIG. 13. For example, the decision unit 110 may be constituted to include at least one of the reference data storage unit 308, the reference data acquisition unit 309, and the reference data update unit 310. Alternatively, the reference data storage unit 308, the reference data acquisition unit 309 and the reference data update unit 310 may be provided as functional units independent and separated from the decision unit 110, or may be provided as functional units inside the behavior decision unit 306.

Embodiment 7

Figure 14:
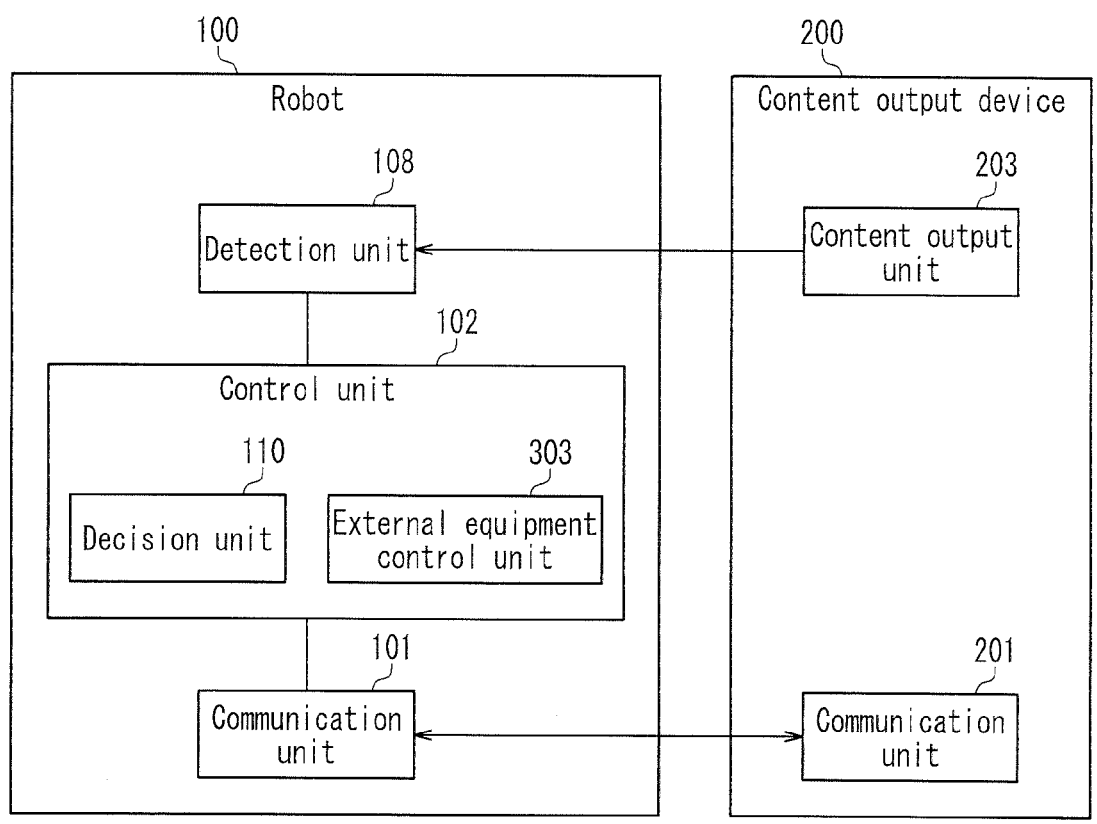
FIG. 14 is a functional block diagram showing a constitution of a robot in Embodiment 7.

The present embodiment is a variation of a constitution of a robotic system. FIG. 14 is a functional block diagram showing a constitution of a robot in accordance with the present embodiment. In the example as shown in FIG. 14, the robot 100 includes a detection unit 108, a control unit 102 and a communication unit 101. The control unit 102 includes a decision unit 110 and an external equipment control unit 303. The detection unit 108 detects at least one of the audio and the image of the content outputted by the content output device 200. The decision unit 110 assess on the basis of the reference data the information detected by the detection unit 108, thereby assesses the content outputted by the content output device 200. The external equipment control unit 303 controls, through the communication unit 101, the content output by the content output device 200.

Specifically, for the detection unit 108, the control unit 102, the decision unit 110, the external equipment control unit 303 and the communication unit 101 in the present embodiment, for example, units that are similar to those according to at least one of the above-described Embodiments 1-6 can be employed.

In the above-mentioned constitution, the robot 100 has a processing system for detecting audio, light and images from the content output device 200 and assessing the contents, and in addition to this processing system, the robot 100 has a communication system for sending and receiving a control signal or control data with the content output device 200. As a result of this combination, it is possible to perform more flexibly the reception of contents and control of the content output device.

For example, it is possible to control the content output by use of the content output device 200, on the basis of the result of the content assessment made by the decision unit 110. It is also possible for the robot 100 to assess the contents autonomously and allow the content output device 200 to output a content according to the preference unique to the robot 100.

Further the robot 100 can control the content output device in accordance with the operation of the user. For example, the robot 100 is provided with an input device such as a touch panel, a button or the like, so that it can control the content output device corresponding to the user's operation received through the input device. Thereby, the user can use the robot 100 as a remote controller for remote-controlling the content output device 200.

Furthermore, the robot 100 may be provided with a function to switch a control mode of the content output device 200 due to the user's operation and a control mode of the content output device 200 on the basis of the content assessment result made by the decision unit 110. For example, when there is no operation input by the user, the robot 100 can control autonomously the content output on the basis of the assessment result by the decision unit 110. When there is any operation input from the user, the robot 100 can control the contents on the basis of the user's instruction.

The content output device 200 may be a device such as a so-called laser pointer that outputs light. In this case, the detection unit 108 of the robot 100 detects light (bright spot) irradiated by the content output unit 203 onto an object, the floor, the wall or the like, and/or the track of the light. When the user illuminates an object with light by use of the laser pointer, the decision unit 110 collates the flashing pattern of light detected by the detection unit 108 with the reference data that have been registered in advance, so that these patterns can be interpreted as specific commands (or information). The control unit 102 can allow the robot 100 to move in accordance with the command or information interpreted by the decision unit 110. The external equipment control unit 303 may send to the laser pointer through the communication unit 101 and the communication unit 201 a signal or data indicating that the laser pointer is detected or the command is interpreted. Receiving the signal or the data, the laser pointer can change the color of light outputted by the laser pointer from red to green for example. Thereby, the user can know that the robot has understood the command. In this manner, it is possible to constitute the units so that the detection unit 108 detects bright spots of light illuminated onto the object by the content output device 200, the decision unit 110 analyses the track of the detected bright spot, and furthermore, the control unit 102 controls either the behavior or the state of the robot 100 on the basis of information obtained from the analyzed track. According to this constitution, the laser pointer can be used as a command device with respect to the robot. As a result, operations of the robot with a remarkably simple user interface can be realized. For example, if the user points out a certain position with the laser pointer and draws a track of specific figure allocated to the "move" command, the robot moves to the indicated position.

The detection unit 108 can detect the bright spot by deciding whether in the images photographed by a camera there is any pattern that matches the predetermined bright spot in the color and shape for example. Alternatively, it is possible to detect the bright spot by a camera to detect only the optical band of the laser pointer. In this case, the detection unit 108 can be constituted with a camera to photograph through a filter to pass a light of a predetermined band. There is no necessity of detecting the bright spot within the predetermined region such as a predetermined screen. For example, the detection unit 108 can scan and photograph around the robot 100 and detect the bright spot from the photographed images.

Further, the content output device can be combined with a laser pointer and any other output device. For example, a laser pointer and a display can be combined to provide a content output device, so that a bright spot of the laser pointer illuminated by the user onto the display is detected by the robot 100, thereby the position of the display will be detected. Alternatively, the robot 100 may be constituted to detect the display, and at the time of capturing the display screen of the display device, the robot 100 detects also the bright spot of the laser pointer illuminated onto the display screen so as to analyze the track.

[Other Variation]

The present invention is not limited to the above-mentioned examples of the embodiments of the present invention explained as Embodiments 1-7. For example, though the contents in the above embodiments are videos, the contents are not limited to the videos, but include what can be browsed, appreciated, or experienced by human beings. For example, the contents include writings, still images, moving images, music, games or a combination thereof. Further, the contents can be stored as digital or analog data in a memory, and transmitted through a transmission path. The data of contents are reproduced, displayed or executed so that a human being can browse, appreciate or experience them.

Examples of equipment applicable as the display device 200 are not limited to the above-mentioned ones but include also tablet terminals such as portable phones, PDA (personal data assistances), electronic book reproduction terminal (electronic book readers), multifunctional portable phones, electronic dictionaries, portable video game machines and multifunctional remote controllers. Display devices not being a tablet type, such as a television set and a photo frame also can be used. Further, the content output device is not limited to a display device, but it can be a reproducer such as a music player to output music contents.

For example, in a case where the display device is a television set, it is possible to select one channel from known channels in place of acquiring a content list and selecting a content from the content list. In such a case, the communications between the display device and the robots can be provided easily also by use of infrared remote controller.

The present invention is preferred as a system including a robot to make a unique content assessment. Further, it can be applied as a toy robot that has unique preference so that the user can have affinity thereto.

The invention claimed is:

1. A robot comprising:
   a detection unit that detects an image of a content outputted by a content output device;
   a decision unit that recognizes a person included in the image of the content by matching the image detected by the detection unit with reference data that include a template image of the person, and groups the content according to the person recognized in the image;
   a control unit that controls a behavior or a state of the robot based on the grouping made by the decision unit; and
   a communication unit that communicates directly with the content output device independently of the detection unit; and
   an external equipment control unit that controls the content outputted by the content output device through the communication unit based on the grouping made by the decision unit.

2. The robot according to claim 1, further comprising a setting unit that acquires setting information for communication with the content output device by analyzing the image outputted by the content output device.

3. The robot according to claim 2, wherein the setting information comprises access information for accessing to the content output device and certified information for obtaining access permission.

4. The robot according to claim 1, further comprising a search unit that acquires a shot image around the robot by the detection unit and recognizes a display screen of the content output device by recognizing a rectangle in the acquired shot image.

5. The robot according to claim 4, wherein when the robot is in an idle state continuously for a predetermined time, the search unit starts an action of the recognition.

6. The robot according to claim 1, wherein when at least one of the person and an action pattern of the person contained in the reference data is recognized in the images of the content detected by the detection unit, the decision unit increases or decreases a value indicating favorability of the robot with respect to the content; and
   the control unit controls the behavior or the state of the robot based on the favorability.

7. The robot according to claim 1, further comprising a reference data storage unit that stores as the reference data at least one of the person and an action pattern of the person detected in the image acquired by the detection unit.

8. The robot according to claim 1, further comprising:
   a reference data acquisition unit that acquires, as the reference data, either data recorded in the content output device through the communication unit or data recorded on a location indicated by information recorded in the content output device.

9. The robot according to claim 1, further comprising a reference data update unit that updates the reference data based on the person recognized by the decision unit.

10. The robotic system according to claim 1, wherein the decision unit calculates a value indicating favorability of the robot with respect to the content; and
    the external equipment control unit controls a content being outputted or to be outputted by the content output device, by use of the value indicating the favorability.

11. The robot according to claim 1, wherein the decision unit detects an action pattern of the person from the image detected by the detection unit; and
    the control unit allows the robot to move in accordance with the action.

12. The robot according to claim 1, wherein when the decision unit judges that the content output by the content output device is suspended, the control unit allows the robot to perform a predetermined action.

13. The robot according to claim 6, wherein the decision unit groups contents further according to values indicating the favorability of the robot, and
    the control unit allows the robot to output information indicating at least one of the grouped contents.

14. The robot according to claim 1, wherein the external equipment control unit controls the content output device to reproduce the content at a frequency according to the grouping made by the decision unit.

15. A robot control method comprising:
- a detection step of detecting an image of a content outputted by a content output device;
- a decision step, executed by a processor of a robot, of recognizing a person included in the image of the content by matching the image detected in the detection step with reference data that include a template image of the person, and grouping the content according to the person recognized in the image;
- a control step of controlling a behavior or a state of the robot based on the grouping made by the decision step; and
- an external equipment control step of controlling the content outputted by the content output device based on the grouping made by the decision unit through a communication unit that communicates directly with the content output device independently of the detection step.

16. A non-transitory recording medium that stores a robot control program for allowing a computer to execute:
- a detection process of detecting an image of a content outputted by a content output device;
- a decision process of recognizing a person included in the image of the content by matching the image detected in the detection process with reference data that include a template image of the person, and grouping the content according to the person recognized in the image;
- a control process of controlling a behavior or a state of the robot based on the grouping made by the decision process; and
- an external equipment control process of controlling the content outputted by the content output device based on the grouping made by the decision process through a communication unit that communicates directly with the content output device independently of the detection step.

* * * * *